M. MACEK ET AL 2,950,603

POST DRIVER

Filed Sept. 7, 1954

Matthew Macek
John W. Macek
Henry Macek
  INVENTORS

BY *Clarence A. O'Brien*
*and Harvey B. Jackson*
  Attorneys

Aug. 30, 1960

M. MACEK ET AL 2,950,603

POST DRIVER

Filed Sept. 7, 1954

Matthew Macek
John W. Macek
Henry Macek
INVENTORS

BY Clarence A.O'Brien
and Harvey B. Jacobson
Attorneys

Aug. 30, 1960   M. MACEK ET AL   2,950,603
POST DRIVER

Filed Sept. 7, 1954   7 Sheets-Sheet 6

Matthew Macek
John W. Macek
Henry Macek
INVENTORS

BY *Clarence A. O'Brien*
*and Harvey B. Jacobson*
Attorneys

Aug. 30, 1960 M. MACEK ET AL 2,950,603
POST DRIVER

Filed Sept. 7, 1954 7 Sheets-Sheet 7

Matthew Macek
John W. Macek
Henry Macek
INVENTORS

BY Clarence A. O'Brien
and Harvey B. Jacobson
Attorneys

United States Patent Office 2,950,603
Patented Aug. 30, 1960

2,950,603

POST DRIVER

Matthew Macek, John W. Macek, and Henry Macek, all of R.F.D. 1, McKees Rocks, Pa.

Filed Sept. 7, 1954, Ser. No. 454,576

1 Claim. (Cl. 61—74)

This invention relates in general to new and useful improvements in power equipment, and more specifically to an improved post driver.

At the present time, guard rails for our highways are primarily in the form of posts driven into the ground with suitable railings attached thereto. The posts are relatively sturdy and are oftentimes in the form of structural beams cut in short lengths and driven into the ground. Because of the size of the fence posts and the nature of the ground in which they are often driven, it is necessary to provide a relatively heavy pile driver. On the other hand, inasmuch as the posts have to be driven only a relatively short distance and since so many posts must be driven, it is necessary that the post driver be extremely portable.

It is therefore the primary object of this invention to provide an improved post driver which is mounted on a truck so that it may be easily transported from one post location to the next, the post driver being so constructed that it may be quickly and easily set up for a post driving operation.

Another object of this invention is to provide an improved post driver which is so constructed that the driving hammer and the guide carriage thereof may be easily swung around to the exact spot at which a post is to be driven and which may be quickly and easily vertically disposed.

Another object of this invention is to provide an improved post driver which is so constructed that the main portion thereof may be shifted back and forth on its mounting platform in order to compensate for the degree of slope of the road on which the truck carrying the post driver is parked in order to prevent accidental tipping over of the truck and the post driver.

A further object of this invention is to provide an improved post driver which is provided with control means of such nature that the post driver may be actuated by a single operator from a position immediately adjacent the driving head of the post driver so that the operator of the post driver may have a clear vision of the driving operation at all times.

A still further object of this invention is to provide an improved post driver which includes a post driving assembly mounted on a truck, the truck being provided at its rear with a seat for receiving a lower portion of a guide carriage for a post whereby the entire post driver is firmly secured for its transport.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
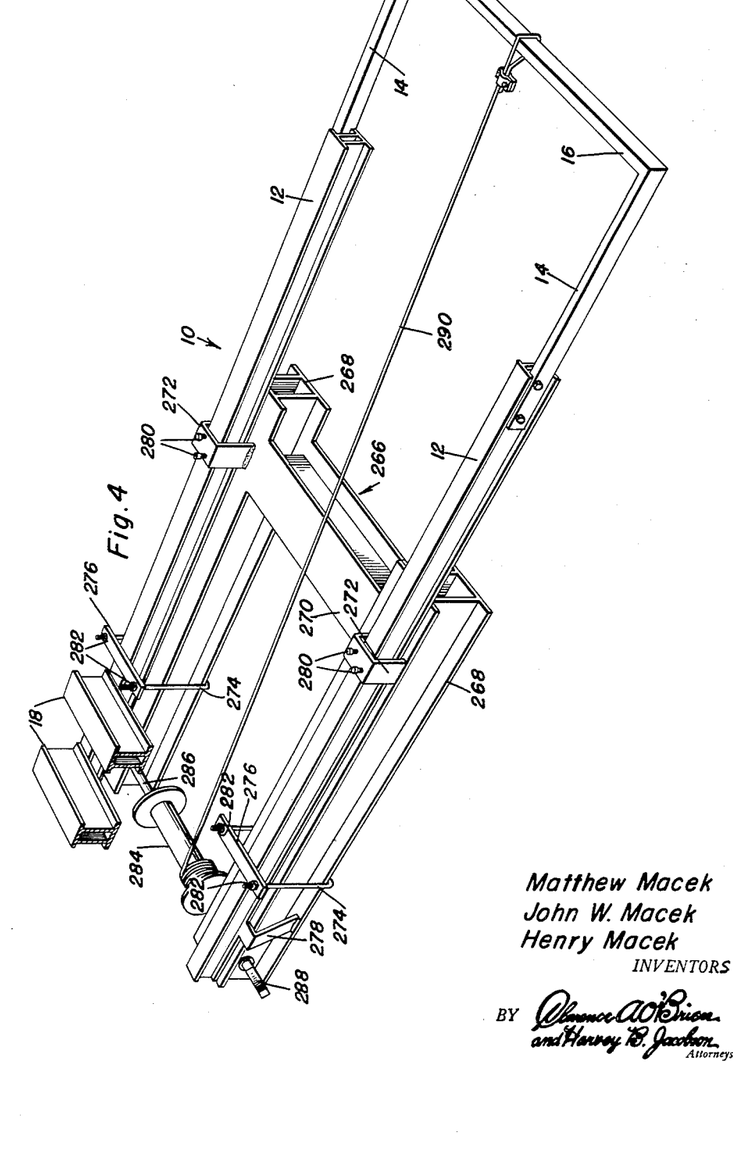
Figure 4 is a fragmentary perspective view showing the relationship between the machinery base of the post driver and the platform supporting the post driver whereby the machinery base may be selectively slid with respect to the platform to provide proper balance of the post driver.

Referring now to the drawings in detail, it will be seen that the post driver, which is the subject of this invention, includes a machinery base which is referred to in general by the reference numeral 10. As is best illustrated in Figure 4, the machinery base 10 includes a pair of spaced, relatively heavy frame rails 12 which have secured to the forward ends thereof relatively light weight extensions 14. The extensions 14 are connected together by a forward transverse frame member 16. Overlying the rear portions of the frame rails 12 and securing them together are relatively heavy rear transverse frame members 18.

Figures 8, 11:
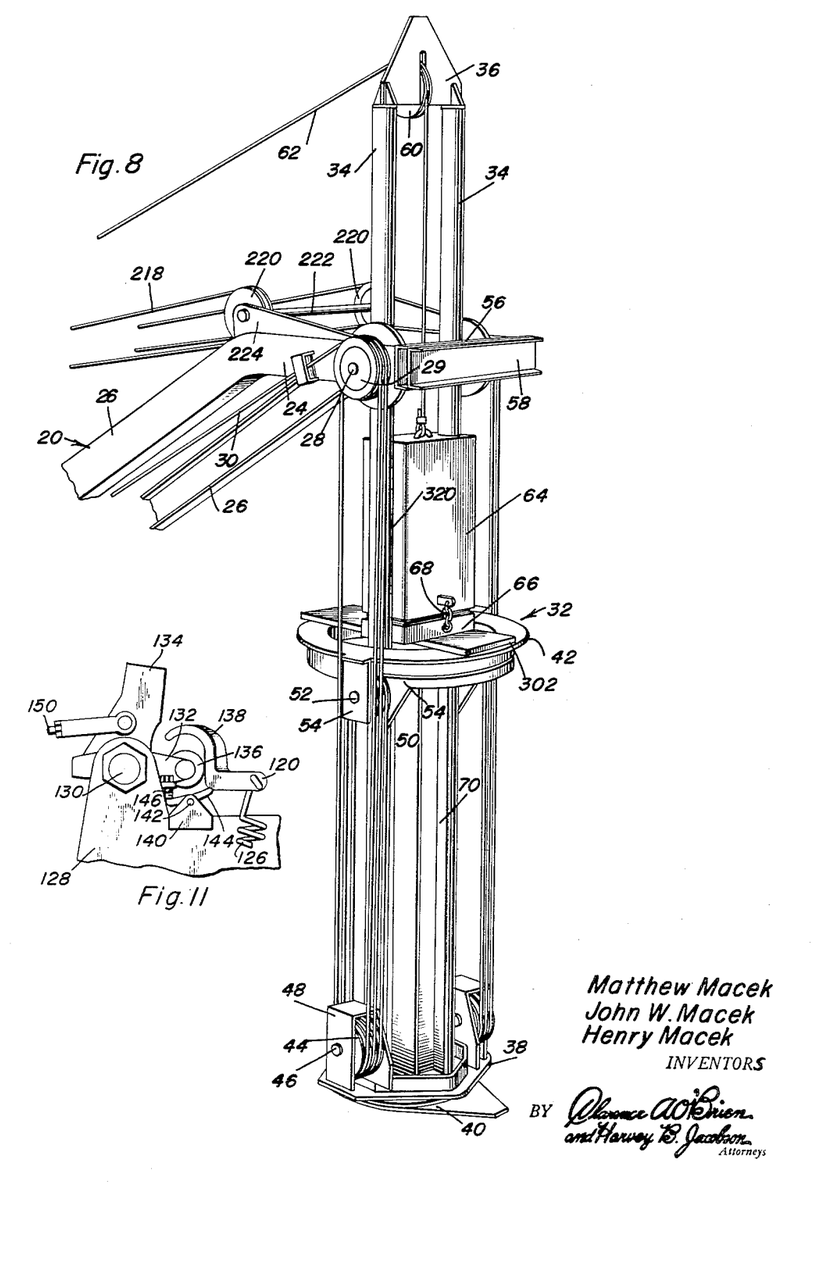
Figure 8 is an enlarged perspective view of the driving head of the post driver and shows the relationship thereof with respect to the boom from which it is suspended.
Figure 11 is a detail view, taken upon an enlarged scale, of a portion of the control mechanism shown in Figure 9.

Suitably pivotally connected to an intermediate portion of the machinery base 10 and extending upwardly and forwardly in overlying relation to the forward portion thereof is a boom which is referred to in general by the reference numeral 20. The boom 20 includes an elongated upwardly and forwardly sloping portion 22 which terminates at its forward end in a generally horizontal forward portion 24. As is best illustrated in Figure 8, the boom 20 is formed by a pair of longitudinal members 26 which are disposed in generally spaced relation.

Carried by the horizontal forward portion 24 of each of the members 26 adjacent the forward end thereof is a transverse shaft 28. Mounted on the transverse shaft 28 of each of the members 26 outwardly of the boom 20 is a multiple sheave 29 which has entrained thereover a line 30. The two lines 30 support in suspended relation from the forward portion of the boom 20 a guide carriage which is referred to in general by the reference numeral 32.

The guide carriage 32 includes a pair of spaced parallel vertical frame members 34 which are secured together at their upper ends by a vertically disposed, generally triangular plate 36. The lower ends of the vertical frame members 34 are connected together by a horizontal lower frame member 38 which has secured to the underside thereof a ground engaging plate 40. The vertical frame members 34 are also reinforced intermediate their ends by an annular intermediate frame member 42.

The lines 30 extend over the sheaves 29 and down about multiple sheaves 44 carried by shafts 46 mounted in inverted U-shaped brackets 48 secured to the lower frame member 38. In addition to being reeled back and forth over the sheaves 29 and 44, the lines 30 have intermediate portions reeved over intermediate sheaves 50. The intermediate sheaves 50 are mounted on horizontal shafts 52 suspended by suitable hangers 54 carried by the intermediate frame member 42. Thus, by pulling on or slacking up on the lines 30, the height of the guide carriage 32 may be varied as desired.

In order that twisting of the guide carriage 32 with respect to the boom 20 may be prevented, the shafts 28 are preferably extended through the frame members 26 so as to be disposed inwardly thereof. Carried by the shafts 28 within the general confines of the boom 20 are suitable arcuate cross-sectional shoes 56 which are pivotally mounted on the shafts 28. The shoes 56 guidingly engage the vertical frame members 34 and permit the sliding movement thereof therethrough. Inasmuch as the shoes 56 are pivotally mounted on the shafts 28, the guide carriage 32 may be pivoted with respect to the boom 20 to desired positions. In order to prevent twisting of the forward portion of the boom 20, the forward end of the frame members 26 are connected together by relatively heavy transverse frame members 58.

Carried by the vertical plate 36 is a sheave 60 which partially seats within the vertical plate 36. Entrained over the sheave 60 is a line 62 which has connected to the lower end thereof a drop hammer 64. The drop hammer 64 is provided with a detachable driving head 66 which is secured thereto temporarily for lifting purposes by chains 68 disposed on opposite sides of the drop hammer 64. The driving head 66 is intended to be seated on a post, such as the post 70, and struck by the drop hammer 64 upon dropping thereof to drive the post 70 into the ground. The ground engageable plate 40 is provided with an opening therethrough conforming to the cross-section of the post 70 so as to guide the lower portion of the post 70 when being driven into the ground.

Figure 6:
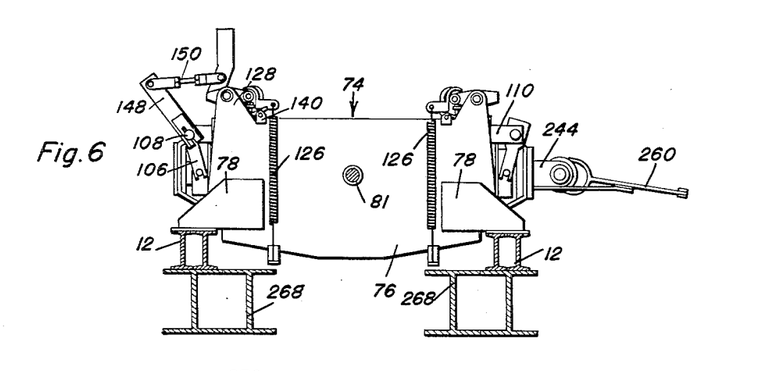
Figure 6 is an enlarged fragmentary transverse vertical sectional view taken substantially upon the plane indicated by the section line 6—6 of Figure 1 and shows the general relationship of the linkage for controlling the operation of the drums of Figure 5.

In order that the guide carriage 32 may be suitably positioned and the drop hammer 64 actuated, there is mounted on the rear cross-frame members 18 a suitable power source, preferably in the form of a gasoline engine 72. Mounted directly forwardly of the gasoline engine 72 on the machinery base 10 is a winch assembly which is referred to in general by the reference numeral 74. As is best illustrated in Figure 6, the winch assembly 74 includes a mounting housing 76 having outwardly extending gusset plates 78 resting upon and secured to the frame rails 12.

Figure 1:
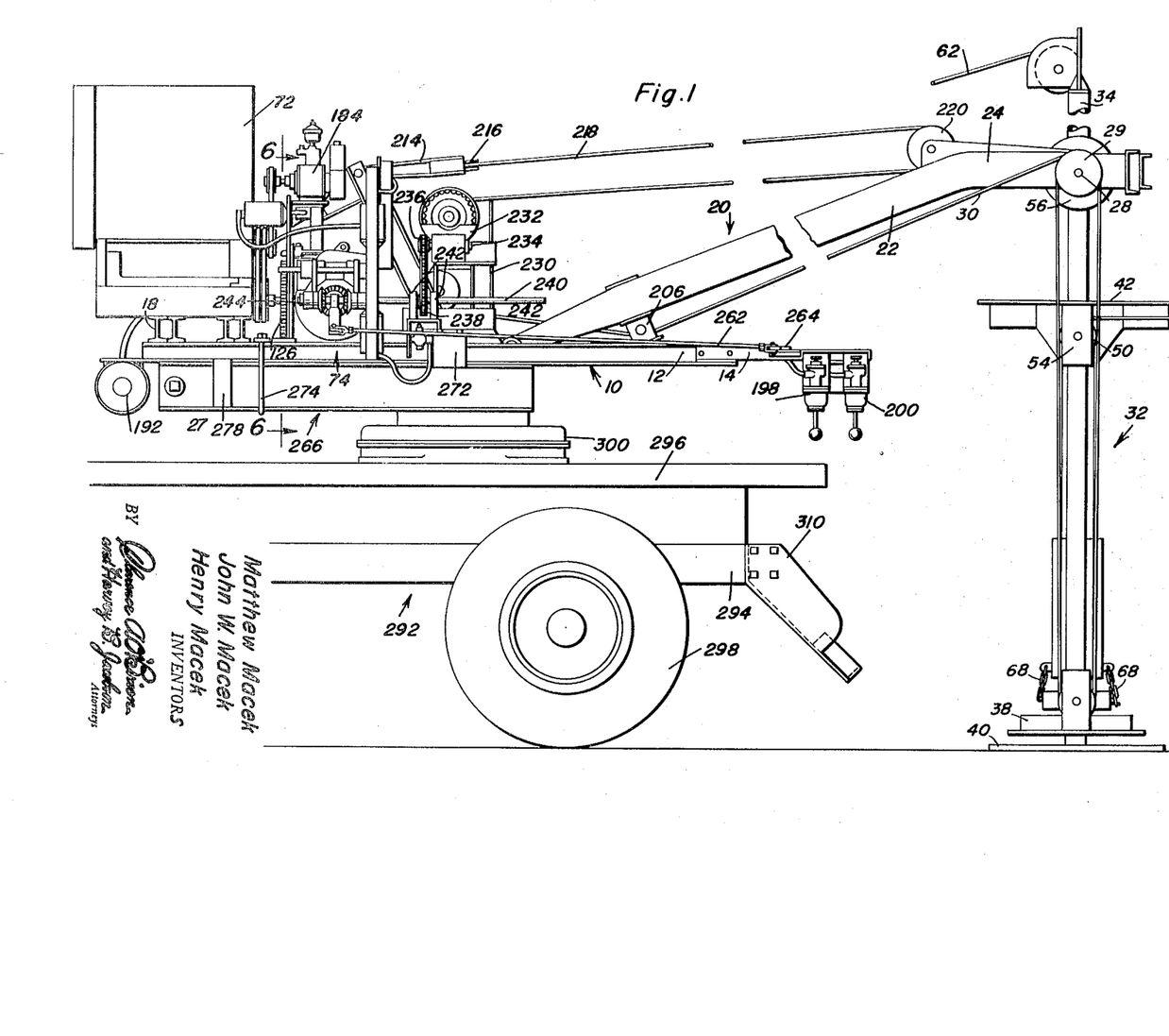
Figure 1 is a side elevational view of the rear portion of a truck having mounted thereon the post driver which is the subject of this invention, intermediate portions of the post driver being broken away.
Figure 2:
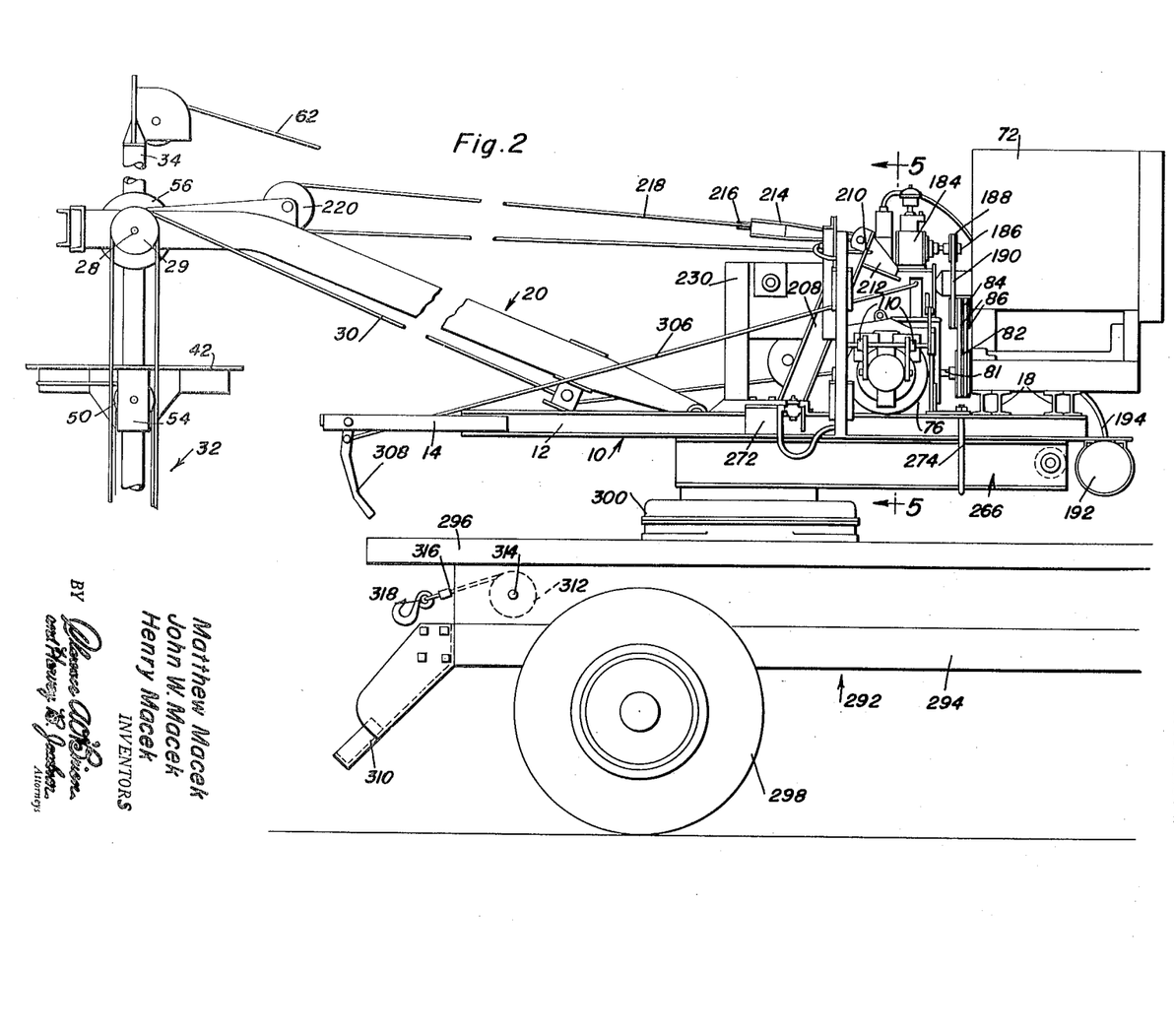
Figure 2 is a fragmentary side elevational view of the post driver of Figure 1 taken from the opposite side of the truck and shows the details of the assembly as viewed from the opposite side thereof, portions of the post driver being broken away.
Figure 5:
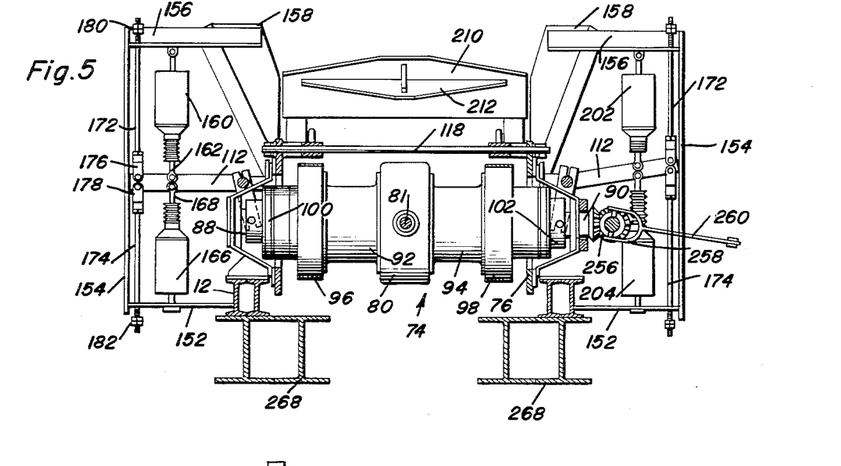
Figure 5 is an enlarged transverse vertical sectional view taken substantially open the plane indicated by the section line 5—5 of Figure 2 and shows the general arrangement of the drums for controlling operation of the drop hammer and the positioning of the guide carriage of the post driver and the means for controlling the operation of the drums.

Referring now to Figure 5 in particular, it will be seen that the winch assembly 74 includes a central gear case 80 which has extending rearwardly therefrom a drive shaft 81. Referring now to Figures 1 and 2 in particular, it will be seen that the drive shaft 81 is disposed below the general horizontal plane of the drive shaft of the gasoline engine 72 and has mounted thereon a multiple drive pulley 82. The drive pulley 82 is aligned with a multiple drive pulley 84 of the gasoline engine 72 and is drivingly connected thereto by suitable drive belts 86.

Referring once again to Figure 5 in particular, it will be seen that the gear case 80 has extending outwardly from opposite sides thereof drive shafts 88 and 90. Mounted on the drive shafts 88 and 90 are identical drums 92 and 94, respectively. Secured to the outer portions of the drums 92 and 94 are brake drums 96 and 98, respectively. In order to effect driving of the drums 92 and 94 by the drive shafts 88 and 90, there is mounted on the drive shafts 88 and 90 suitable clutch assemblies 100 and 102, respectively.

The clutch assemblies 100 and 102 are of a conventional twin disk type and include relatively simple actuating mechanism. Inasmuch as the actuating mechanism for the clutch assembly 100 is substantially identical to the actuating mechanism for the clutch 102, only the actuating mechanism for the clutch 100 will be set forth in detail.

Figure 9:
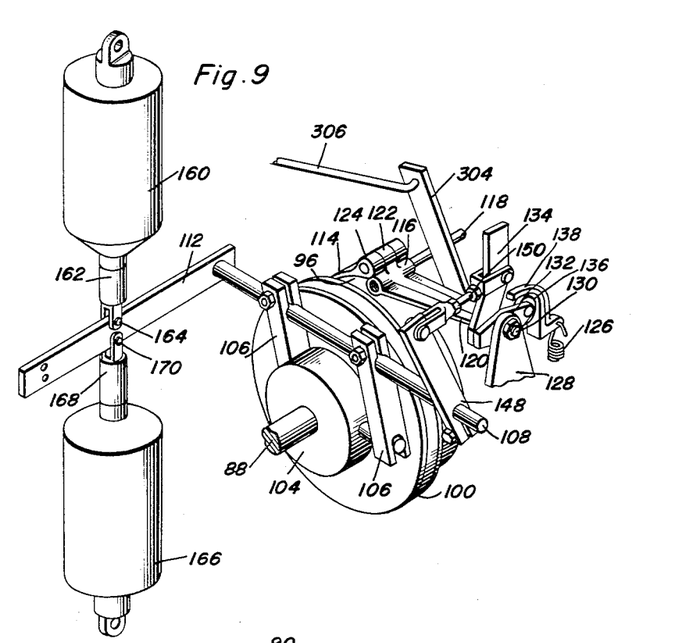
Figure 9 is an enlarged fragmentary perspective view showing the controls for the drum which controls the positioning of the guide carriage.

The actuating mechanism for the clutch assembly 100, see also Figure 9, includes a collar 104 slidably mounted on the drive shaft 88. The clutch assembly 100 is movable to engage the driving disk of the clutch assembly 100. Pivotally connected to the collar 104 are arms 106 of a yoke assembly. The arms 106 are carried by a control shaft 108 suitably pivotally mounted in bearings 110 carried by the housing 76. Connected to the forward end of the shaft 108 is a control arm 112.

Encircling the brake drum 96 is a brake band 114. The brake band 114 terminates at one end in a sleeve 116 pivotally mounted on a transverse shaft 118 suitably mounted with respect to the housing 76. The sleeve 116 has connected thereto a control arm 120 for pivoting it about the shaft 118. Connected to the sleeve 116 by an ear 122 is a fitting 124 for the opposite end of the brake band 114. Connected to the rear end of the arm 120 is a coil spring 126 whose lower end is suitably anchored. The coil spring 126 urges the rear end of the arm 120 downwardly to urge the arm 120 to a brake setting position.

In order that the brake band 114 may be moved to a released position, there is extending upwardly from the housing 76 adjacent the rear end of the arm 120 an ear 128. The ear 128, see Figure 11 also, includes a longitudinally extending pivot 130 which has pivotally mounted thereon a transversely disposed rocker bar 132. The rocker bar 132 has rigidly secured to the outer end thereof a control arm 134 for rocking it about the pivot 130.

The rocker bar 132 has mounted at the inner end thereof a transversely disposed roller 136. The roller 136 is received in an inverted J-shaped extension 138 on the arm 120. Thus, when the rocker bar 132 is rocked in a counter-clockwise direction, as viewed in Figure 9, the roller 136 will engage the J-shaped extension 138 and urge the arm 120 upwardly against the downward urging of the spring 126 to release the brake band 114.

Secured to the housing 76 in inwardly offset relation with respect to the ear 128 is a pair of longitudinally aligned ears 140. The ears 140 have extending therebetween a longitudinal shaft 142 which has mounted thereon for pivoting with the shaft 142 a rocker plate 144. The rocker plate 144 has one edge thereof underlying an outer edge of the arm 120. The outer edge of the rocker plate 144 underlies a pin 146 adjustably carried by the rocker bar 132 and projecting downwardly therefrom.

When the rocker bar 132 is rocked in a clockwise direction, as viewed in Figure 9, the pin 146 moves downwardly and engages the outer edge of the rocker plate 144. This results in the inner edge of the rocker plate 144 swinging upwardly and engaging the underside of the arm 120 to urge the arm 120 upwardly against the downward urging of the spring 126 to again release the brake band 114.

In the normal operation of the drum 92, the control arm 112 is in a horizontal position. When it is desired to engage the drum 92 to rotate the same in response to rotation of the drive shaft 88, the control arm 112 is moved downwardly with the result that the clutch assembly 100 is engaged. At the same time, an arm 148 carried by the rear end of the shaft 108 swings outwardly and through an adjustable link 150 extending between the arm 148 and the arm 134 pulls the arm 134 outwardly to rock the rocker bar 132 in a counter-clockwise direction. This results in the roller 136 lifting the arm 120 upwardly to release the brake drum 96 simultaneously with the actuation of the clutch assembly 100.

When the control arm 112 is moved back to its central horizontal position, the collar 104 releases the clutch assembly 100 simultaneously with the return of the brake band 114 to its initial brake drum gripping position by the spring 126.

When it is desired to release the brake drum 96 without operating the clutch assembly 100, the control arm 112 has the outer end thereof moved upwardly, as viewed in Figure 9. Further outward movement of the collar 104 in no way effects the operation of the clutch assembly 100. However, the inward pivoting of the arm 148 and the resulting inward pivoting of the arm 134 results in the rocker bar 132 pivoting in a clockwise direction. The pivoting of the rocker bar 132 in a clockwise direction results in the rocker plate 144 urging the arm 120 upwardly to release the brake band 114 so that the drum 92 will be free to rotate.

It is to be understood that the controls for the drum 94 will be identical to that outlined above with the exception that the controls will be on the opposite side of the post driver and that the general relation of the parts will be reversed, as is understandable.

In order that the control arm 112 may be remotely operated, see Figure 5, there is secured to the associated frame rail 12 an outwardly projecting bar 152. The bar 152 has connected to the outer end thereof a vertical number 154. The upper end of the vertical member 154 has connected thereto an inwardly extending angle member 156 which is, in turn, secured to an upwardly and outwardly sloping reinforcing member 158 suitably secured to the machinery base 10.

Suitably suspended from the angle member 156 is a fluid motor 160 which includes an extensible plunger 162. The lower end of the plunger 162 is pivotally connected to the control arm 112 by a pivot pin 164, as is best illustrated in Figure 9. Secured to the bar 152 and extending upwardly therefrom in opposed relation to the fluid motor 160 is a similar fluid motor 166. The fluid motor 166 includes an extensible plunger 168 which is connected to the control arm 112 by a pivot pin 170.

In order to limit the movement of the control arm 112, there is provided limit means in the form of opposed rods 172 and 174. The rods 172 and 174 are pivotally connected to the outer end of the control arm 112 by suitable fittings 176 and 178, respectively. The upper end of the rod 172 extends through the angle member 156 and is provided with adjustable stop nuts 180. The lower end of the rod 174 extends through the bar 152 and is provided with adjustable stop nuts 182.

In order that the fluid cylinders 160 and 166 may be suitably actuated, the post driver includes a compressor or fluid pump 184 mounted on the top part of the housing 76. The fluid pump 184 includes a drive shaft 186 on which there is mounted a drive pulley 188. The drive pulley 188 overlies a pulley portion of the multiple pulley 84 and is connected thereto by a drive belt 190.

Carried by the rear part of the machinery base 10 beneath the engine 72 is a fluid pressure tank 192. The fluid pressure tank 192 is communicated with the fluid pump 184 by a supply line 194.

Figure 3:
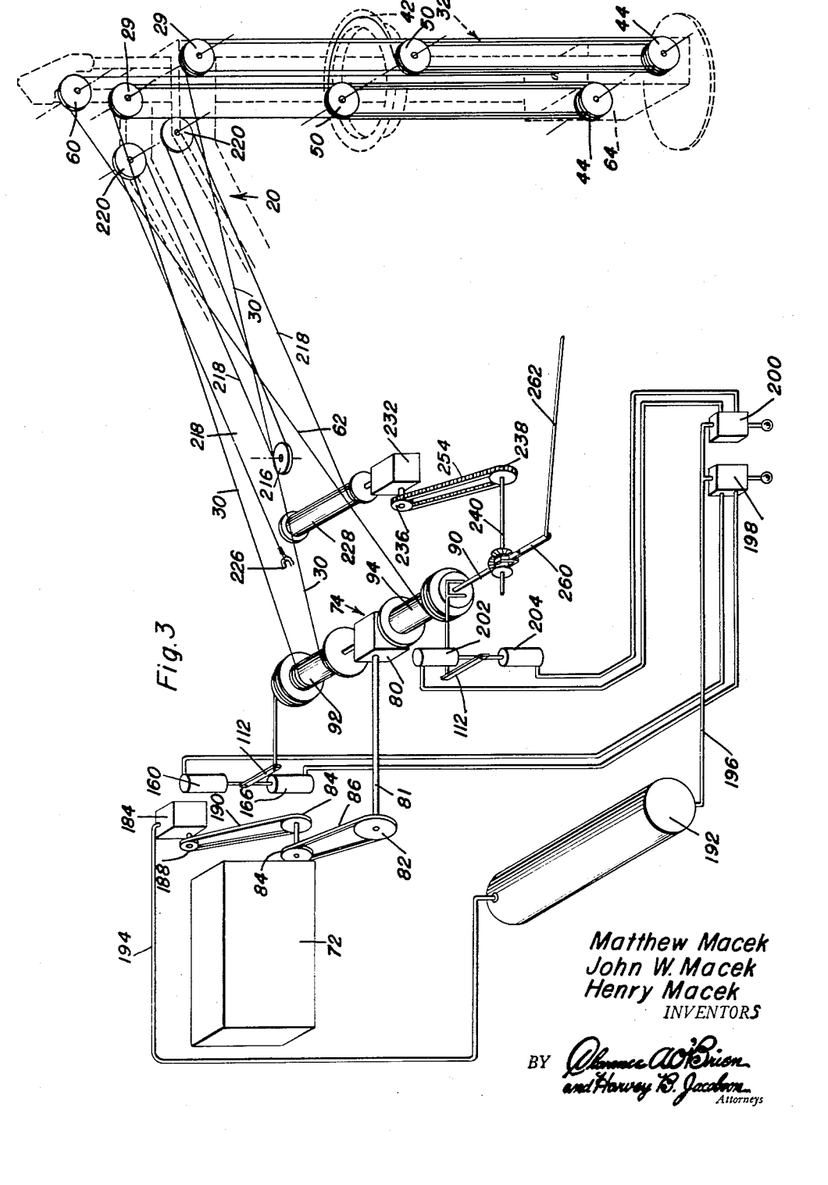
Figure 3 is a schematic view of the operating mechanism of the post driver and shows the manner in which it is controlled.

As is best illustrated in Figure 3, there is connected to the fluid pressure tank 192 a fluid line 196. The fluid line 196 has connected thereto valves 198 and 200 which control the operation of the drums 92 and 94, respectively. The valve 198 controls the actuation of the fluid motors 160 and 166 whereas the valve 200 controls the actuation of an upper fluid motor 202 and lower motor 204 which, in turn, controls the operation of the control arm 112 for the drum 94. As is best illustrated in Figure 1, the valves 198 and 200 are mounted at the forward end of the machinery base 10 adjacent the guide carriage 32.

Referring once again to Figure 3 in particular, it will be seen that the rear ends of the lines 30 are entrained over the drum 92. Thus, by manipulating the valve 198, the drum 92 may be selectively rotated in the desired direction to raise or lower the guide carriage 32. In order that the lines 30 may be conveniently entrained over the drum 92, they have intermediate portions thereof entrained over a guide assembly 206 carried by the rear portion of the boom 20, as is best illustrated in Figure 1. The rear end of the line 62 is trained over the drum 94. Thus, by manipulating the control for the drum 94, the drop hammer 64 may be selectively raised and lowered.

Secured to the forward part of the housing 76 and extending upwardly from the machinery base 10 is a pair of upwardly and rearwardly sloping beams 208. The beams 208 are vertically disposed and have extending therebetween a plate 210 which is reinforced on its rear side by a plate-like brace 212.

Disposed forwardly of the plate 210 and secured thereto by a fitting 214 is a horizontally disposed sheave 216. The sheave 216 has entrained thereover a central portion of a line 218. The line 218 extends forwardly from the sheave 216 and is entrained over a pair of vertical sheaves 220 mounted on the forward portion 24 of the boom 20. The sheaves 220 are carried by a transverse shaft 222 which, in turn, is supported by a pair of upwardly extending plates 224 mounted on the forward portions of the members 26.

One end of the line 218 is secured to the plate 210 by an eye 226. The other end of the line 218 is entrained on a forwardly disposed drum 228. The drum 228 is mounted in a suitable frame 230 carried by the machinery base 10 forwardly of the winch assembly 74. Mounted on the frame 230 at the right side of the drum 228, as viewed from the rear, is a gear box 232. The gear box 232 is of the non-reversible type and includes a longitudinal drive shaft 234 which has mounted on the rear end thereof a drive gear 236. The drive gear 236 is vertically aligned with a drive gear 238 carried by an elongated longitudinally extending shaft 240. The forward portion of the shaft 240 is suitably journaled in ears 242 of the frame 230 and the rear portion of the shaft 240 is suitably mounted in bearings 244 carried by the housing 76.

Figure 7:
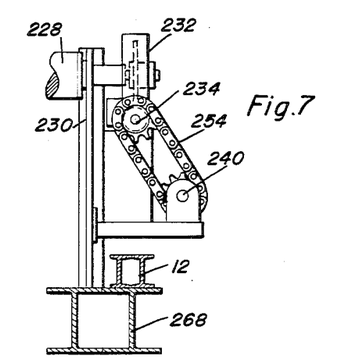
Figure 7 is an enlarged fragmentary sectional view taken substantially upon the plane indicated by the section line 7—7 of Figure 1 and shows the connection between a drive shaft and a gear assembly for driving a drum controlling the positioning of the boom of the post driver.
Figure 10:
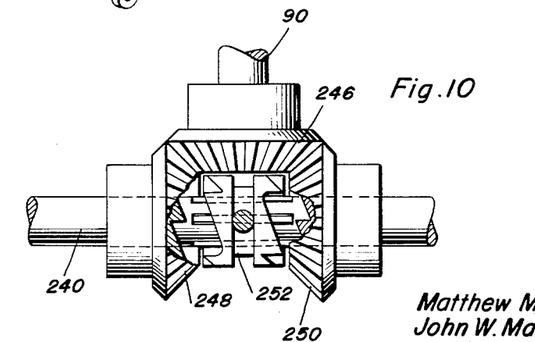
Figure 10 is an enlarged fragmentary plan view showing the details of the power take-off driver for the boom controlled drum.

Referring now to Figures 5, 7 and 10, in particular, it will be seen that the outer end of the shaft 90 is provided with a bevel gear 246. The bevel gear 246 has extending by the face thereof the shaft 240 on which there are mounted spaced bevel gears 248 and 250 which are in constant engagement with the bevel gear 246 in diametrically opposed relation so that they rotate in opposite directions. Suitably keyed on the shaft 240 for longitudinal sliding is a driving dog 252 which is suitably lockably engaged with either of the bevel gears 248 and 250, as desired, to rotate the drive shaft 240. Inasmuch as the drive shaft 240 is connected to the drive shaft 234 by a drive chain 254, the rotation of the drum 228 may be varied as desired to raise or lower the boom 20.

The driving dog 252 has rotatably mounted thereon a collar 256 which, in turn, has connected thereto a shifting yoke 258. The shifting yoke 258 has connected thereto a rigid arm 260 which, in turn, has connected to the outer end thereof an elongated longitudinally extending control rod 262. The control rod 262 is anchored on the machinery base 10 adjacent the valves 198 and 200 and is actuated by a control lever 264. Thus, the raising and lowering of the boom 20 may be remotely controlled.

Referring once again to Figure 4 in particular, it will be seen that the machinery base 10 is slidably mounted on a platform which is referred to in general by the reference numeral 266. The platform 266 includes a pair of heavy frame rails 268 which underlie the frame rails 12 and have the frame rails 12 resting thereon. The frame rails 268 are connected together adjacent their forward ends by a relatively heavy transverse frame member 270.

In order that the frame rails 12 may be limited to longitudinal movement only on the frame rails 268, there is secured to the upper part of each of the frame rails 268 adjacent the forward end thereof an inverted U-shaped guide 272 which is received over an associated one of the frame rails 12. Additionally, there is carried by each of the frame rails 268 adjacent the rear portion thereof a U-shaped bolt 274 which has the upper ends thereof connected by a strap 276 overlying the associated frame rail 12. The frame rails 12 are further guided by combined braces and guides 278 carried by the outer parts of the rear portions of the frame rails 268 and engaging the lower flanges of the frame rails 12.

In order that the machinery base 10 may be retained in an adjusted position on the platform 266, each of the guides 272 has carried by the upper portion thereof adjustable set bolts 280 which may selectively clamp the upper flange of each of the frame rails 12. Also, carried by the U-bolts 274 for adjustment thereon are nuts 282 which may be tightened to clamp the bars 276 against the frame rails 12.

In order that the machinery base 10 may be moved rearwardly on the platform 266, there is carried by the platform 276 a drum 284. The drum 284 is mounted between the rear portions of the frame rails 268 and is carried by a shaft 286 which extends between and is journaled in the frame rails 268. One end of the shaft 286 is provided with a crank 288 through the use of which the drum 284 may be selectively rotated.

Carried by the drum 284 is a line 290 which has the forward end thereof connected to the forward transverse frame member 16 of the machinery base 10. When it is desired to move the machinery base 10 and all of the machinery carried thereby rearwardly with respect to the platform 266, it is merely necessary to crank the shaft 286 and reel in the line 290. The manner in which the machinery base 10 may be moved forwardly on the platform 266 will be described in more detail hereinafter.

Referring now to Figure 1 in particular, it will be seen that the platform 266, as well as the machinery base 10, are mounted on the rear portion of a truck which is referred to in general by the reference numeral 292. The truck 292 includes a frame 294 on which there is mounted a bed 296. Carried by the bed 296 forwardly of the rear wheels 298 is a turntable 300. The turntable 300 is, in turn, connected to the platform 266 to permit rotation thereof with respect to the truck 292.

Although it would appear that the description of the various parts of the machinery base 10, the machinery carried thereby and the platform 266 is in reverse, it is to be understood that these parts were described in relationship to their operation. Thus, the guide carriage 32 would be at the forward end or the operating end of the post driver.

In the operation of the post driver, the platform 266 and the machinery base 10 are first rotated so that the boom 20 overlies the side of the truck 292 and the guide carriage 32 is disposed along a side of the truck 292. This is accomplished by rotating the turntable 300 either through a suitable crank (not shown) or through a power take-off connected thereto. When this has been accomplished, the drop hammer 64 to which the driving head 66 has been connected by the chain 68 is then elevated to the position of Figure 8 and seated on a plank 302 resting upon the intermediate frame members 42. The guide carriage 32 is then swung to the desired position and vertically aligned. In order that the guide carriage 32 may be slowly lowered, there is provided a separate control for releasing the brake band 114 of the drum 92.

This control consists of a control arm 304 which is secured to the arm 120 and extends upwardly therefrom. Connected to the upper portion of the control arm 304 is an elongated operating rod 306 which extends to the forward part of the machinery base 10, as is best illustrated in Figure 2. The operating rod 306 is connected to a control lever 308 which is, in turn, pivotally connected to one of the extensions 14. By operating the control lever 308, the guide carriage 32 may be slowly lowered into place at the desired point where it is desired to drive a post, such as the post 70. Then, by shifting the boom 20, the guide carriage 32 may be vertically disposed. When the guide carriage 32 has been properly positioned, a post 70 is mounted in the lower portion thereof with the lower end projecting down through the opening in the ground engageable plate 40.

Next, the drop hammer 64 is lifted so that the driving head 66 clears the plank 302 which is then removed. The drop hammer 64 is then lowered until the driving head 66 rests upon the top of the post 70. It is to be understood that the driving head 66 will fit onto the top of the post 70 and remain seated thereon. The chains 68 are then removed, and the drop hammer 64 raised up to a position adjacent the plate 36 and dropped. This is continued until the post 70 has been driven into the ground the desired distance.

When a post 70 has been driven into the ground a desired distance, the drop hammer 64 is then again attached to the driving head 66 and raised to an elevated position and then seated upon the plank 302 which has then been replaced. The guide carriage 32 is then lifted through the use of the lines 30 so that it clears the post 70 which has just been driven. The truck 292 is then driven to the next site which will be only a few feet away.

Inasmuch as a major portion of the post driver extends transversely of the truck 292, when the truck 292 is parked on a transversely sloping roadway, there is a tendency for the truck 292 to overturn. It is for this reason that the machinery base 10 is slidably mounted on the platform 266. When the guide carriage 32 is disposed downhill, the machinery base 10 is moved uphill on the platform 266 through the use of the drum 284. On the other hand, when the guide carriage 32 is disposed uphill from the truck 292, the machinery base 10 is moved uphill along the platform 266 by first seating the guide carriage 32 on the ground. Then, with the machinery base 10 released with respect to the platform 266, the line 30 is reeled in with the result that the weight of the guide carriage 32 will cause movement of the machinery base 10 relative to the platform 266.

In order that the post driver may be conveniently transported down the road on the truck 292, there is provided at the rear end of the frame 294 of the truck 292 a seat 310. The seat 310 is of a size and shape to receive the ground engageable plate 40 of the guide carriage 32. In order that the ground engageable plate 40 may be properly seated within the seat 310, there is mounted in the truck bed 296 a winch 312, as is best illustrated in Figure 2. The winch 312 is provided with a shaft 314 on which there is mounted a crank (not shown) for rotating the same. Entrained over the drum 312 is a line 316 which has carried at the rear end thereof a hook 318. The hook 318 is suitably engageable with the lower portion of the guide carriage 32 to pull the guide carriage 32 from an elevated position over to and down onto the seat 310 as the guide carriage 32 is simultaneously lowered. The cable 316 continues to retain the guide carriage 32 properly seated on the seat 310 during transporting of the post driver.

It is pointed out at this time that the fluid motors and their respective fluid systems may be in the form of pneumatic cylinders with the fluid being in the form of compressed air, if desired. It is also pointed out that the vertical frame members 34 of the guide carriage 32 also form guideways for the drop hammer 64, the drop hammer 64 having suitable recesses 320 extending vertically along the side edges thereof.

With the present invention, it is possible to drive posts, such as guard rail posts, which are closely spaced together at a much faster rate than previously possible, and at the same time using either the same number or less men.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A post driver comprising a machinery base, a boom pivotally attached to said machinery base and extending outwardly therefrom, a guide carriage carried by an outer end of said boom for guided vertical movement relative thereto, said guide carriage being adapted to be seated on the ground and have received in the lower portion thereof a post to be driven, a drop hammer carried by said carriage for repeated guided vertical movement therethrough, said machinery base being mounted on a wheeled frame, a guide carriage seat carried by said wheeled frame at the rear thereof for receiving the lower portion of said guide carriage during transport, said guide carriage seat sloping downwardly and rearwardly whereby said guide carriage may be mounted on said guide carriage seat with said boom in its normal operating position.

References Cited in the file of this patent

UNITED STATES PATENTS

| | | |
|---|---|---|
| 331,740 | Stigers | Dec. 1, 1885 |
| 332,687 | Weeden | Dec. 15, 1885 |
| 810,261 | Cantelow | Jan. 16, 1906 |
| 997,613 | Gabriel | July 11, 1911 |
| 1,372,838 | Smith | Mar. 29, 1921 |
| 1,395,895 | Bellony | Nov. 1, 1921 |
| 1,613,409 | Pierce | Jan. 4, 1927 |
| 1,699,480 | Snow | Jan. 15, 1929 |
| 1,728,665 | Crist | Sept. 17, 1929 |
| 1,846,973 | Lanier | Feb. 23, 1932 |
| 1,905,528 | Thornley | Apr. 25, 1933 |
| 2,040,668 | Nichols | May 12, 1936 |
| 2,122,686 | Gaty | July 5, 1938 |
| 2,496,706 | Fiedler | Feb. 7, 1950 |
| 2,533,130 | Mastriani | Dec. 5, 1950 |
| 2,541,970 | Pospisil | Feb. 13, 1951 |
| 2,557,873 | Jarrell | June 19, 1951 |
| 2,593,186 | Richardson | Apr. 15, 1952 |
| 2,609,667 | Jourdain | Sept. 9, 1952 |
| 2,655,006 | Hoen et al. | Oct. 13, 1953 |